April 23, 1968
A. J. GRINER
3,379,350
ARTICLE CONVEYING, SEPARATING AND STACKING APPARATUS
Filed Dec. 31, 1963
2 Sheets-Sheet 1
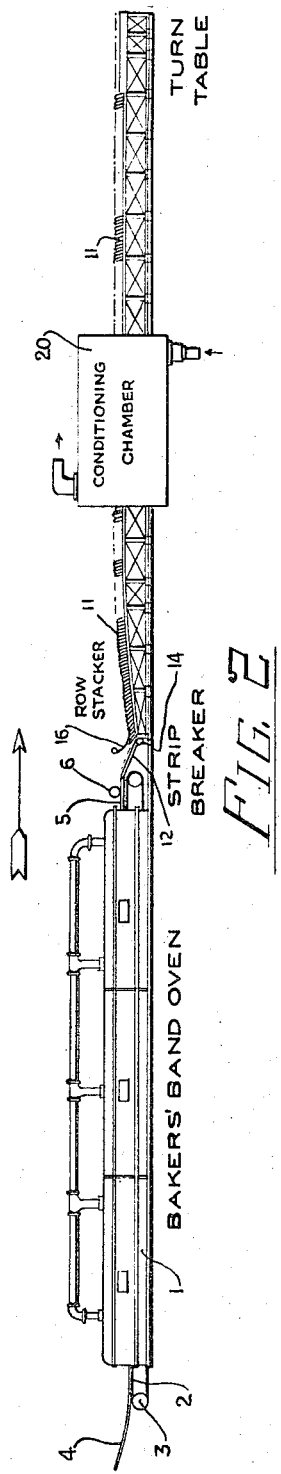
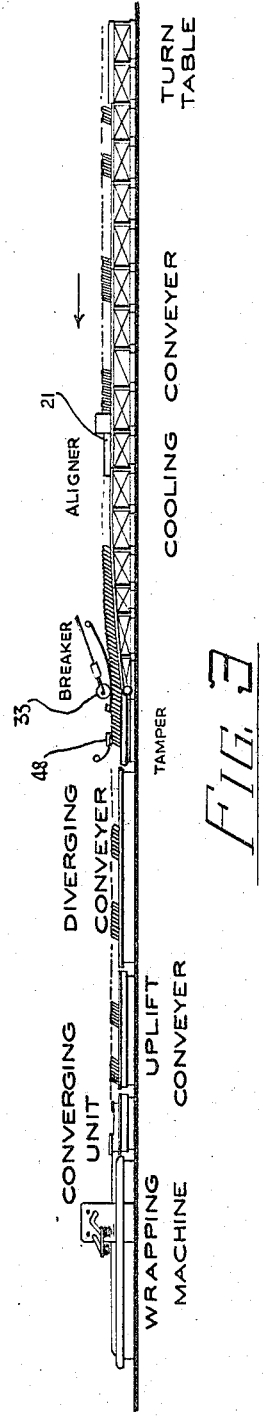
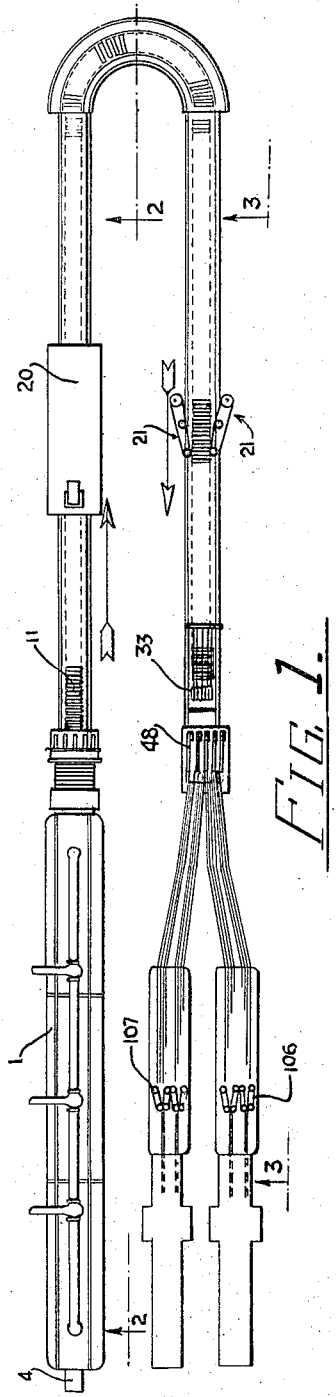
INVENTOR.
ARTHUR J. GRINER
BY Bauer & Seymour
ATTORNEYS

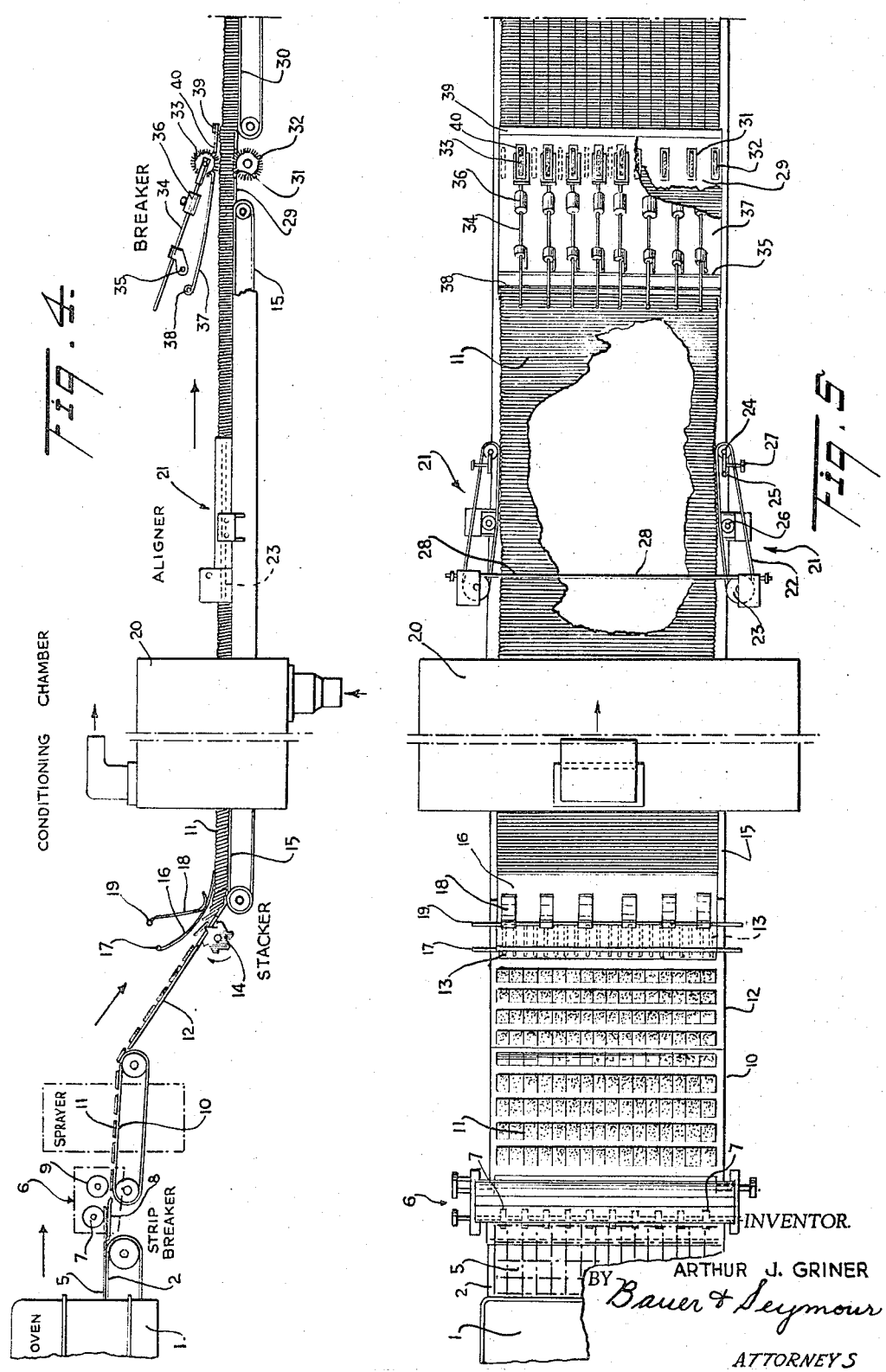

United States Patent Office 3,379,350
Patented Apr. 23, 1968

3,379,350
ARTICLE CONVEYING, SEPARATING
AND STACKING APPARATUS
Arthur J. Griner, Wyckoff, N.J., assignor to National
Biscuit Company, a corporation of New Jersey
Continuation-in-part of application Ser. No. 310,532,
Sept. 19, 1952. This application Dec. 31, 1963, Ser.
No. 334,796
22 Claims. (Cl. 225—97)

This application is a continuation-in-part of my parent application Ser. No. 310, 532, filed Sept. 19, 1952, for "Packaging Method and Means," and now abandoned.

The present invention relates to the automatic handling of relatively flat articles, such as biscuit in the form of crackers, cookies and the like, and more particularly to apparatus for continuously conveying such articles from a baker's band oven while stacking, conditioning, and breaking the same for automatic packaging.

A main purpose of the invention is to provide means for automatically advancing and handling bake goods and comparable products between a continuously producing bake oven or other production apparatus and packaging machinery, leaving only occasional adjustments to be made by attendants in charge of the equipment.

The apparatus of the present invention comprises means in novel combination for continuously conveying, shingling or stacking articles edgewise, and breaking shingled or stacked articles in strip form into individual units or panels.

By way of example, the invention is particularly suited to and is illustrated and described herein in connection with the handling of crackers or biscuit baked in a continuous line oven wherein the biscuit are baked and emerge on a continuous moving belt conveyor in the form of large sheets which are longitudinally and transversely scored to divide the same into biscuit-size areas. The scored sheets issuing from the oven are first broken along the transverse scores to form transverse strips of unseparated biscuit which are shingled or stacked on edge by novel means in a novel manner and conveyed through a conditioning zone wherein the baked strips may be kept warm to prevent too rapid cooling, or if desired, may be cooled by forced air circulation, depending upon the nature and requirements of the product.

While the shingled or stacked strips are continuously conveyed broadside, they are next broken by novel means along the longitudinal scores into unit size biscuits or panels, thus forming substantially contacting side-by-side rows or columns of stacked panels. In practice, there may be as many as sixteen or more rows thus formed, depending upon the width of the individual crackers and the width of the oven band. The contacting adjacent rows are then caused by novel apparatus to diverge or fan out laterally so that the distance between adjacent rows is progressively increased. If desired, selected groups of rows may be caused to diverge still further, whereby the contents of several rows may be later converged and fed to each of several wrapping machines. The rows in each group are next consolidated by further novel apparatus into a single row without interrupting the advancing movement of the biscuit and the resulting single line or row is automatically divided into metered, segregated sections or packageable units and fed into a machine for packaging in the manner disclosed in the aforesaid parent application. In the illustrated embodiment by this method and apparatus, the full width of the dough sheet as carried on the oven band is transposed from a total of sixteen crackers, for example, across the width of the band to a continuous automatic feed of crackers stacked edgewise in four columns.

It is then an object of the present invention to provide novel apparatus adapted for automatically handling bake goods, such as crackers and other generally flat articles, in accordance with a novel method whereby the same travel continuously from mass production equipment through breaking equipment therefor.

Another object of the invention is to provide a novel means for shingling or stacking relatively flat articles while the same are being continuously conveyed.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a diagrammatic plan view of the general organization of conveying and packaging equipment for carrying out the present invention;

FIG. 2 is a view in elevation of a part of the equipment shown in FIG. 1, the view being taken on line 2—2 of FIG. 1;

FIG. 3 is a view in elevation of the equipment shown in FIG. 1, the view being taken on line 3—3 of FIG. 1; and FIGS. 4 and 5 are diagrammatic side elevation and plan views, respectively, of a portion of the equipment showing in more detail and on a larger scale the breaking, shingling and aligning mechanisms.

Referring to the drawings, which exemplify one form of apparatus embodying the invention, it will be seen that in FIG. 1, which is a diagrammatic top plan view of the general organization of equipment for continuous automatic delivery of crackers from a band oven to a wrapping machine, there is shown a band oven 1, which according to standard practice in the baking industry consists of a long baking chamber of successive tunnel sections rising from a suitable base support. An endless baking band 2 is trained over a driving drum 3 at the entrance end of the oven. The upper run of band 2 extends through the heated section of the oven chamber, whereas the lower run returns beneath the heated section.

An endless dough sheet 4 of a width sufficient to cover the band 2, save for small margins at the side edges, is fed continuously into the entrance end of the oven. The dough sheet, having its top surface die stamped or scored transversely and longitudinally prior to baking in order to define thereon individual crackers of rectangular shape, will upon completion of baking be discharged from the exit end of the oven in the form of a baked sheet 5. The baked sheet is then transported by the conveyor belt through a strip breaker 6 which comprises revolving rollers or brushes 7 (FIG. 4) exerting pressure upon the baker sheet as it is transported over a portion of the conveyor system that varies sharply from the normal plane of travel. This may be effected by a deflector plate 8 positioned beneath the revolving rollers or brushes 7. After passing under the latter, the leading edge of the baked sheet engages the lower portion of a roller 9 mounted generally above a short drop-off from plate 8 to a belt conveyor 10 to direct the leading edge of the sheet downwardly. At this point, the transverse rows of biscuit forming the baked sheet are caused by tension from the change of their normal path of travel to bend and snap off along their transverse frangible score lines to form strips 11 consisting usually of about sixteen crackers connected to each other at their side edges.

The strips 11 lying flat and preferably in slightly spaced relation may be conveyed through a sprayer and thence to novel mechanism for tilting and shingling the strips with the upper surfaces remaining uppermost, and the lead edges engaging the conveyor. From belt 10, the separated strips 11 are delivered to a plate or slide 12 which preferably but not necessarily slopes sufficiently downward to cause the strips to slide down the same at a speed comparable to the speed at which they are delivered by belt 10.

Near its bottom edge slide 12 has a plurality of transversely spaced longitudinal slots 13. A plurality of cam discs 14 are mounted for rotation with a driven transverse shaft and extend a short distance upwardly through slots 13. The cam discs rotate clockwise as viewed in FIG. 4 at a speed in excess of the speed at which the cracker strips advance down slide 12 so that each strip is engaged by a plurality of the cam discs and kicked upwardly to permit the following strip to move beneath it and thus into overlapping or shingled relation therewith. After passing the cam discs 14 the strips 11 are delivered to a belt conveyor 15 which moves more slowly than conveyor 10. The forward advance of the cracker strips is thus slowed down, and the strips become compacted and somewhat more erect on an edge. An apron 16, which is preferably somewhat flexible, is pivotally supported on a rod 17, extends downwardly and forwardly above cam wheels 14 and rests on the upper edges of the shingled strips on conveyor 15. The central portion of apron 16 above cam discs 14 functions to limit the upward movement of the crackers when the same are lifted in response to engagement thereof by the cam discs. A plurality of flat springs 18 or the like may be pivoted at 19 and suspended to engage apron 16 and hold the same in position.

Conveyor 15, which is preferably a porous metal belt, may, if desired, convey the stacked or shingled strips 11 through a conditioning chamber 20 through which either heated or cooled air or other gas may be circulated by suitable means, such as blowers or exhaust fans. The air may be circulated in either direction through the chamber and hence, may pass either upwardly or downwardly through the belt 15 and between the crackers or other articles thereon.

Upon emerging from the conditioning chamber on conveyor belt 15, the conveyed articles may be carried in the open air through a further conditioning zone to permit cooling, if necessary, at room temperature. If space permits, the equipment may be extended in a straight line, as in FIG. 5, but in the embodiment illustrated in FIGS. 1 to 3, the cooling conveyor includes a turntable which reverses the direction of flow. Near the end of the cooling conveyor the crackers pass through suitable aligning means 21 which may be of any suitable known construction. As illustrated each aligner unit comprises an endless V belt 22 mounted on a drive pulley 23 and a laterally adjustable idler pulley 24 mounted on an arm pivotally mounted at 25. A third guide pulley 26 may be mounted between pulleys 23 and 24 for normally fixed lateral adjustment. A set screw 27 is provided for adjustably limiting the movement of pulley 24 outwardly away from the end edges of the cracker strips 11, and a suitable spring may be provided for yieldably resisting inward movement of the pulley 24 by the set screw. A shaft 28 drivably connects the two drive pulleys 23. When the oppositely disposed pulleys 24, 24 are properly adjusted, the two belts 22 operating in the same direction and at the same speed as conveyor belt 15 will function to shift the mass of advancing strips laterally if necessary to properly align the longitudinal or vertical scores thereon with the breaker mechanism to be next described.

Promptly after leaving the alignment mechanism, the stacked strips pass through a novel mechanism whereby each strip 11, while shingled or stacked on edge with adjacent strips, is broken at the longitudinal or vertical scores into individual panels of unit cracker size. In the form shown, the novel breaker mechanism comprises a stationary plate 29 which bridges the delivery end of conveyor 15 and the receiving end of a belt conveyor 30.

Plate 29 has a plurality of transversely spaced longitudinally extending slots 31 aligned with one group of alternate scores on the strips 11. Below the plate and projecting a short distance through the slots therein are a series of driven disc-like brushes 32. The latter thus engage the lower edges of the cracker strips 11 at alternate scores and are driven in a clockwise direction, as viewed in FIG. 4, at a speed appreciably faster than the advancing speed of the strips to thereby apply a forward as well as an upward pressure or force to the strips at the lower end of the score lines.

Mounted above the advancing column of strips 11 are a plurality of idler disc-like brushes 33 which ride on and engage only the upper edges of the strips 11 in line with the longitudinal or vertical scores which alternate transversely with those in alignment with the lower brushes 32. Thus, the bottom edges of the strips are engaged by brushes 32 at the lower end of one group of alternate scores, and the upper edges are engaged at the upper ends of the remaining scores by rollers or brushes 33. As shown, each of the latter is rotatably mounted on the forward end of a rod or bar 34 that is mounted for pivotal movement about the axis of a cross shaft 35. Rods 34 may be suitably mounted for longitudinal adjustment relative to shaft 35, and suitable means are provided for adjusting the weight or pressure of rollers 33 on the cracker strips to thereby control the downward pressure and retarding effect of the brushes on the cracker strips. In the illustrated embodiment, weights 36 are adjustably mounted on rods 34 for this purpose. It is preferable that the upper brushes 33 be adjusted to engage a given cracker strip 11 at the same time it is engaged by the lower brushes 32. By thus applying oppositely directed pressures to the upper and lower edges of the strips 11 at the ends of alternate vertical scores, the strips are broken along the score lines as they pass between brushes 32 and 33 to thereby form a plurality of side-by-side contacting rows of individual crackers or similar articles as the same are moved in parallel paths by conveyor belt 30.

Suitable means, such as an apron 37, may be provided for holding the crackers against excessive upward movement as the same pass between the breaker brushes 32, 33 and for insuring any necessary realignment of the upper edges of the rows of individual crackers. Apron 37 is pivotally mounted at 38 and the same is suitably curved so that the free end portion thereof rests on the upper edges of the shingled or stacked crackers. In one operable embodiment, the apron 37 is made of thin metal weighted at 39 and provided with slots 40 to permit engagement of the crackers by brushes 33.

Although only a limited number of embodiments of or variations in the article handling apparatus comprehended by the invention have been illustrated in the drawings and described in the foregoing specification, it is to be expressly understood that the invention is not thus limited. Various changes and modifications which do not depart from the spirit and scope of the invention will now be apparent to those skilled in the art.

What is claimed is:

1. Apparatus of the character described adapted to transform an elongated sheet of baked dough having a plurality of longitudinal and lateral scores first into rows of shingled individual baked dough strips and then into files of individual panels by conveying said sheet and breaking said conveyed sheet along said lateral scores to form a plurality of laterally extending strips, which comprises in sequential combination along the line of travel of the baked dough being processed:
   means for shingling said strips;
   means for conveying said shingled strips;
   means for engaging each of the conveyed shingled strips along the respective top edges thereof only; and
   means for breaking the engaged shingled strips along said longitudinal scores thereof.

2. Apparatus as recited in claim 1, wherein the means for conveying said shingled strips comprises a flexible belt, the engaging means comprises a sheet-like member resting on the top edges of said strips, and the breaking means comprises a first group of rollers mounted to apply pressure upwardly against the bottom edges of said strips and a second group of rollers mounted to apply pressure downwardly against the top edges of said strips, each of the first group of rollers being aligned with one of a first group of longitudinal scores, each of the second group of rollers being aligned with one of a second group of longitudinal scores, and each of said second group of longitudinal scores being disposed between a pair of the said first group of longitudinal scores.

3. Apparatus of the character described adapted to process the output of a bake oven along a given predetermined line of travel for the baked goods output by conveying from the oven, at a given linear speed, a continuous sheet of hot freshly baked bakery goods of the class including crackers, the sheet being frangibly scored along lines longitudinal to the direction of sheet movement, and by repeatedly separating from the sheet in timed relationship to the speed of sheet movement a predetermined length of the front portion of the sheet thereof, thereby transforming the discharged sheet into a continuous series of similar strips, the separating of the sheet into the said strips being effected relatively close to the oven to separate the sheet into the said strips while the sheet is still relatively hot, which comprises in combination means providing a cooling zone, cooling conveyor means operating at a linear speed less than said linear speed of sheet movement for causing the said strips to become shingled, or partly overlapped, in a direction along their said scored lines prior to the entry of the said strips into the cooling zone and to move in shingled formation in such direction through the cooling zone, means for causing the shingled strips to become cooled within the cooling zone, sufficiently for further processing, and break means located beyond said cooling zone, and acting upon the shingled strips in succession to break each of them along each of its said scored lines.

4. Apparatus according to claim 3, wherein the said cooling conveyor means includes a perforate cooling conveyor on which the said shingled strips are carried through the said cooling zone, and wherein the apparatus further comprises means for forcing cooling air to flow through the perforate conveyor and between, and over the surface of, the shingled strips.

5. Apparatus according to claim 4, wherein the said means for forcing cooling air to flow comprises an exhaust duct having its intake overlying the said perforate conveyor and acting through such conveyor to produce a lowered air pressure above the shingled strips which induces cooling air to flow between the strips and through the conveyor into the said intake.

6. Apparatus according to claim 5, wherein the said cooling conveyor is generally horizontally disposed and the said strips rest thereon and are disposed generally transversely of the direction of conveyor movement, and wherein the apparatus further comprises alignment means acting within the said cooling zone upon the strips held to the cooling conveyor by gravity, said alignment means being adapted to cause corrective rotation about a generally vertical axis of such strips as are materially skewed from a right-angled transverse disposition with respect to the direction of conveyor movement, and further being adapted to correctively move transversely of the cooling conveyor such of the strips as may be necessary to bring the said scored lines of any strip into alignment with the respectively corresponding scored lines of the other strips.

7. Apparatus of the character described adapted to process the output of a bake oven along a given predetermined line of travel for the baked goods output by conveying from the oven, at a given linear speed, a continuous sheet of hot freshly baked bakery goods of the class including crackers, the sheet being frangibly scored along lines longitudinal to the direction of sheet movement, and by repeatedly separating from the sheet in timed relationship to the speed of sheet movement a predetermined length of the front portion of the sheet thereof, thereby transforming the discharged sheet into a continuous series of similar strips, the separating of the sheets into the said strips being effected relatively close to the oven to separate the sheet into said strips while the sheet is still relatively hot, which comprises in combination means providing a conditioning zone, conveyor means operating at a linear speed less than said linear speed of sheet movement for causing the said strips to become shingled, or partly overlaped, in a direction along their said scored lines prior to the entry of the said strips into the conditioning zone and to move in shingled formation in such direction through the conditioning zone, means for causing the shingled strips to become conditioned within the conditioning zone, sufficiently for further processing, and break means located beyond said conditioning zone, and acting upon the shingled strips in succession to break each of them along each of its said scored lines.

8. Apparatus according to claim 7, wherein the conveyor means includes a perforate conveyor on which the said shingled strips are carried through the said conditioning zone and further comprises means for forcing air to flow through the perforate conveyor between, and over the surface of, the shingled strips, said last-named means including an exhaust duct having its intake at one side of said perforate conveyor and acting through said conveyor to produce a lowered air pressure on said one side of the conveyor which induces air to flow between the strips and through the conveyor into said intake.

9. Apparatus for breaking sheet-like strips, such as strips of baked dough stacked on edge and having generally vertical scores, into rows of individual panels, which comprises means for continuously advancing said stacked strips broadside, and means for successively breaking said strips along said vertical scores as the strips advance, said breaking means comprising means applying downward localized pressure on the upper edge of each said strip adjacent the ends of alternate vertical scores and means applying upward localized pressure on the lower edge of each said strip adjacent the ends of the remaining vertical scores.

10. Apparatus as defined in claim 9, wherein the means for applying downward pressure comprises a group of rollers each mounted to engage the upper edge of each said advancing strip adjacent the ends of alternate scores.

11. Apparatus as defined in claim 10 comprising means for adjusting the effective pressure applied by each said roller.

12. Apparatus as defined in claim 9, wherein the means for applying upward pressure comprises a group of power driven rollers each mounted to engage the bottom edge of each said advancing strip adjacent the ends of said remaining vertical scores.

13. Apparatus as defined in claim 9 comprising a stationary platform for supporting each said strip when pressure is applied thereto by said pressure applying means.

14. Apparatus as defined in claim 13, wherein each said strip is advanced across said platform by force applied through the succeeding strips in the stack.

15. Apparatus for breaking sheet-like strips, such as strips of baked dough stacked on edge and having generally vertical scores, into rows of individual panels, which comprises means for continuously advancing said stacked strips broadside, and means for successively breaking said strips along said vertical scores as the strips advance, said breaking means comprising means applying downward pressure on the upper edges of said strips adjacent the ends of alternate vertical scores and a group of disc-like brushes mounted to engage the bottom edge of each said strip adjacent the ends of the remaining vertical scores, and means for driving said brushes at an angular speed such that the peripheral surface of each brush at the point of engagement with the strips moves in the direction the strips are being advanced and at a speed in excess of the speed of strip advancement.

16. Apparatus as defined in claim 15 comprising means positioned above the strips at the upper ends of said remaining scores to resist upward movement of the strips and the panels into which the same are broken.

17. Apparatus as defined in claim 16, wherein said last-named means comprises a sheet-like apron pivotally supported at one end and having the free end portion thereof resting on the upper edges of the strips and panels.

18. Apparatus for breaking sheet-like strips, such as strips of baked dough stacked on edge and having generally vertical scores, into rows of individual panels, which comprises means for continuously advancing said stacked strips broadside, and means for successively breaking said strips along said vertical scores as the strips advance, said breaking means comprising means for applying a localized retarding force on the upper edge of each said strip adjacent the ends of alternate vertical scores and means for applying a localized advancing force on the lower edge of each said strip adjacent the ends of the remaining vertical scores, said forces being applied simultaneously to the same strip as it advances.

19. Apparatus as defined in claim 18, wherein said last-named means comprises a group of rollers driven at an angular speed such that the peripheral surface speed thereof exceeds the speed at which the strips are being advanced.

20. Apparatus for breaking sheet-like strips, such as strips of baked dough stacked on edge and having generally vertical scores, into rows of individual panels, which comprises means for continuously advancing said stacked strips broadside, and means for successively breaking said strips along said vertical scores as the strips advance, said breaking means comprising a first group of rollers each mounted to engage the upper edge of each said advancing strip adjacent the ends of alternate scores and a second group of rollers each mounted to engage the bottom edge of each said advancing strip adjacent the ends of the remaining scores, said groups of rollers being positioned to simultaneously engage the same strip.

21. Apparatus as defined in claim 20 comprising means for rotating the rollers of one said group to thereby apply a force to an edge of each said strip in the direction in which the strips are being advanced.

22. Apparatus as defined in claim 21, wherein said second group of rollers is driven by said last-named means.

References Cited

UNITED STATES PATENTS

| | | | |
|---|---|---|---|
| 760,417 | 5/1904 | Budd | 225—97 |
| 2,252,362 | 8/1941 | Carus | 225—98 |
| 2,261,062 | 10/1941 | Huber et al. | 225—97 |
| 3,071,236 | 1/1963 | Hahn | 198—32 |

JAMES M. MEISTER, *Primary Examiner.*

ERNEST A. FALLER, WILLIAM W. DYER, JR., ANDREW R. JUHASZ, SAMUEL F. COLEMAN,
*Examiners.*

D. L. MAXSON, E. SROKA, *Assistant Examiners.*